(12) United States Patent
Zhu

(10) Patent No.: US 11,178,654 B2
(45) Date of Patent: Nov. 16, 2021

(54) CONFIGURATION METHOD AND DEVICE FOR DOWNLINK CONTROL INFORMATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 62 days.

(21) Appl. No.: 16/637,761

(22) PCT Filed: Aug. 10, 2017

(86) PCT No.: PCT/CN2017/096873
§ 371 (c)(1),
(2) Date: Feb. 9, 2020

(87) PCT Pub. No.: WO2019/028756
PCT Pub. Date: Feb. 14, 2019

(65) Prior Publication Data
US 2020/0252911 A1 Aug. 6, 2020

(51) Int. Cl.
H04W 72/04 (2009.01)
(52) U.S. Cl.
CPC ................................. H04W 72/042 (2013.01)
(58) Field of Classification Search
CPC .................................................. H04W 72/042
See application file for complete search history.

(56) References Cited

U.S. PATENT DOCUMENTS

| 2015/0381216 A1 | 12/2015 | Shor |
| 2017/0215170 A1 | 7/2017 | Islam |
| 2019/0223168 A1* | 7/2019 | Li ........................ H04W 72/04 |

FOREIGN PATENT DOCUMENTS

| CN | 102577571 A | 7/2012 |
| CN | 102714567 A | 10/2012 |
| CN | 104221457 A | 12/2014 |
| CN | 104601315 A | 5/2015 |

(Continued)

OTHER PUBLICATIONS

Intel Corporation, "Open Issues for Wider Bandwidth Operations", 3GPP TSG RAN WG1 NR Ad-Hoc#2 R1-1710583, Jun. 30, 2017 (Jun. 30, 2017), section 2.3.

(Continued)

*Primary Examiner* — Ronald B Abelson
(74) *Attorney, Agent, or Firm* — Syncoda LLC; Feng Ma

(57) ABSTRACT

A method for configuring downlink control information includes: configuring target downlink control information (DCI) for a terminal, the target DCI including control information required by at least one target time-domain transmission unit on at least one target bandwidth portion; and transmitting to the terminal a physical downlink control channel (PDCCH) carrying the target DCI, the target DCI being used by the terminal to perform a corresponding control operation on the target time-domain transmission unit of the indicated target bandwidth portion. As such, a base station can configure for the terminal the control information required by the at least one target time-domain transmission unit on the at least one target bandwidth part, thereby improving the performance of a 5G system.

20 Claims, 23 Drawing Sheets

Base station 100

Terminal 200

(56) References Cited

FOREIGN PATENT DOCUMENTS

| CN | 104604175 | A | 5/2015 |
|---|---|---|---|
| CN | 104798330 | A | 7/2015 |
| CN | 105578608 | A | 5/2016 |
| CN | 105612709 | A | 5/2016 |
| CN | 106664517 | A | 5/2017 |
| CN | 106714320 | A | 5/2017 |
| WO | 2012096431 | A1 | 7/2012 |
| WO | 2017129075 | A1 | 8/2017 |

OTHER PUBLICATIONS

Nokia et al., "On Wider Band Aspects of NR", 3GPP TSG-RAN WG1 Meeting NR#2 R1-1710883, Jun. 30, 2017 (Jun. 30, 2017), entire document.

International Search Report in the international application No. PCT/CN2017/096873, dated Apr. 27, 2018.

English translation of the Written Opinion of the International Search Authority in the international application No. PCT/CN2017/096873, dated Apr. 27, 2018.

First Office Action of the Chinese application No. 201780000844.8, dated Jan. 6, 2021.

Notice of Allowance of the Chinese application No. 201780000844.8, dated Aug. 3, 2021.

* cited by examiner

| Control information required by the $n^{th}$ time-domain transmission unit on bandwidth part 1 | Control information required by the $(n+1)^{th}$ time-domain transmission unit on bandwidth part 1 | Control information required by the $(n+2)^{th}$ time-domain transmission unit on bandwidth part 1 | Control information required by the $n^{th}$ time-domain transmission unit on bandwidth part 2 | Control information required by the $(n+1)^{th}$ time-domain transmission unit on bandwidth part 2 | Control information required by the $(n+2)^{th}$ time-domain transmission unit on bandwidth part 2 |
|---|---|---|---|---|---|
| ←—5 bits—→ | ←—5 bits—→ | ←—5 bits—→ | ←—5 bits—→ | ←—5 bits—→ | ←—5 bits—→ |

FIG. 5B

CONFIGURATION METHOD AND DEVICE FOR DOWNLINK CONTROL INFORMATION

CROSS-REFERENCE TO RELATED APPLICATION

The present application is a national stage of International Application No. PCT/CN2017/096873 filed on Aug. 10, 2017, the disclosure of which is hereby incorporated by reference in its entirety.

TECHNICAL FIELD

The present disclosure relates generally to the technical field of communications, and more specifically to a method and device for configuring Downlink Control Information (DCI).

BACKGROUND

In related art, a terminal can determine a length value of DCI through its own carrier bandwidth value. Under the condition that the carrier bandwidth value is known, the length value of the DCI is a fixed length value.

A piece of DCI may include information fields corresponding to much information, for example, an information field corresponding to resource allocation information configured to indicate resource allocation, an information field corresponding to resource allocation indication information configured to indicate a resource allocation manner, and the like. These information fields are at fixed positions in the DCI, and have fixed bit length values.

In a new-generation communication system, information required to be supported by the DCI may be configured. For example, for DCI indicating a Slot Format Information (SFI) of a transmission direction, the transmission direction may change dynamically. Therefore, it is agreed in standardization discussions to indicate a slot format by using a Group Common-Physical Downlink Control Channel (GC-PDCCH).

However, when a GC-PDCCH is adopted to indicate slot formats on multiple bandwidth parts, or under the condition that a terminal supports multiple bandwidth parts, there is yet no DCI configuration solution in the related art.

SUMMARY

For solving the problem in the related art, embodiments of the present disclosure provide a method and device for configuring DCI.

According to a first aspect of embodiments of the present disclosure, there is provided a method for configuring DCI, which is applied to a base station and includes:

target DCI is configured for a terminal, wherein the target DCI includes control information required by at least one target time-domain transmission unit on at least one target bandwidth part; and a Physical Downlink Control Channel (PDCCH) bearing the target DCI is sent to the terminal, wherein the target DCI is configured for the terminal to execute a corresponding control operation on a target time-domain transmission unit of an indicated target bandwidth part;

wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

According to a second aspect of embodiments of the present disclosure, there is provided a method for configuring DCI, which is applied to a terminal and includes:

a PDCCH bearing target DCI is received from a base station, wherein the target DCI includes control information required by a target time-domain transmission unit on at least one target bandwidth part;

the target DCI is demodulated from the PDCCH; and a corresponding control operation is executed on the target time-domain transmission unit of the target bandwidth part indicated by the target DCI;

wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

According to a third aspect of embodiments of the present disclosure, there is provided a non-transitory computer-readable storage medium, which stores a computer program, the computer program being configured to execute the method for configuring DCI of the first aspect.

According to a fourth aspect of embodiments of the present disclosure, there is provided a non-transitory computer-readable storage medium, which stores a computer program, the computer program being configured to execute the method for configuring DCI of the second aspect.

According to a fifth aspect of embodiments of the present disclosure, there is provided a device for configuring DCI, which is applied to a base station and includes:

a processor; and a memory configured to store an instruction executable for the processor, wherein the processor is configured to:

configure target DCI for a terminal, wherein the target DCI includes control information required by at least one target time-domain transmission unit on at least one target bandwidth part; and send a PDCCH bearing the target DCI to the terminal, wherein the target DCI is configured for the terminal to execute a corresponding control operation on a target time-domain transmission unit of an indicated target bandwidth part;

wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

According to a sixth aspect of embodiments of the present disclosure, there is provided a device for configuring DCI, which is applied to a terminal and includes:

a processor; and a memory configured to store an instruction executable for the processor, wherein the processor is configured to:

receive a PDCCH bearing target DCI from a base station, wherein the target DCI includes control information required by a target time-domain transmission unit on at least one target bandwidth part;

demodulate the target DCI from the PDCCH; and execute a corresponding control operation on the target time-domain transmission unit of the target bandwidth part indicated by the target DCI;

wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

The technical solutions provided in the embodiments of the present disclosure can have the following beneficial effects.

In the embodiments of the present disclosure, the base station can configure the target DCI for the terminal, and the DCI includes the control information required by the at least one target time-domain transmission unit on the at least one target bandwidth part. The base station further sends the PDCCH bearing the target DCI to the terminal, and the terminal, after demodulating the target DCI from the PDCCH, executes the corresponding control operation on the target time-domain transmission unit of/on the target bandwidth part indicated by the target DCI. Through the process, the base station can configure the control information required by the at least one target time-domain transmission unit on the at least one target bandwidth part for the terminal, thus improving performance of a 5th-Generation (5G) system.

In the embodiments of the present disclosure, the base station, when configuring the target DCI for the terminal, can configure the required control information for each target time-domain transmission unit on each target bandwidth part, and the length value of the control information required by each target time-domain transmission unit is the preset length value. The base station can further arrange the control information required by the at least one target time-domain transmission unit on the at least one target bandwidth part according to the preset sequence to obtain the target DCI. Through the process, the base station can configure the control information required by the at least one target time-domain transmission unit on the at least one target bandwidth part for the terminal, thus improving performance of the 5G system.

In the embodiments of the present disclosure, optionally, the length value of the target DCI configured for the terminal by the base station can be the fixed preset total length value or e the configurable total length value, wherein the configurable total length value is based on the length value sum of the control information required by the target time-domain transmission unit on the target bandwidth part. Availability is higher.

In the embodiments of the present disclosure, when the length value of the target DCI is the preset total length value and the length value sum of the control information required by the at least one target time-domain transmission unit on the at least one target bandwidth part is less than the preset total length value, the reserved field can be set in the target DCI, and the reserved field is a field that is not occupied by the control information required by the target time-domain transmission unit and contains no information. Through the process, after the terminal demodulates the target DCI according to the preset total length value, accuracy of the obtained control information required by each target time-domain transmission unit on each target bandwidth part can be ensured.

In the embodiments of the present disclosure, the base station, before configuring the target DCI for the terminal, can further send the length value of the target DCI to the terminal to ensure that the terminal can subsequently demodulate the target DCI successfully from the PDCCH bearing the target DCI according to the length value of the target DCI. Optionally, when the length value of the target DCI is the preset total length value, the preset total length value is sent to the terminal through the target signaling or in the predefinition manner; when the length value of the target DCI is the configurable total length value, the information indicating the configurable total length value can be sent to the terminal through the target signaling. Through the process, accuracy of the target DCI demodulated by the terminal can be ensured.

In the embodiments of the present disclosure, the terminal can receive the PDCCH bearing the target DCI from the base station, and the target DCI includes the control information required by the target time-domain transmission unit on the at least one target bandwidth part. The terminal further demodulate the target DCI from the PDCCH, thereby executing the corresponding control operation on the target time-domain transmission unit of the target bandwidth part indicated by the target DCI. Through the process, the terminal can execute the corresponding control operation on the target time-domain transmission unit of the target bandwidth part indicated by the target DCI according to the control information configured by the base station and required by the at least one target time-domain transmission unit on the at least one target bandwidth part, thus improving performance of the 5G system.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 5B is a second schematic diagram illustrating the DCI configuration scenario, according to the exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terminology used in the present disclosure is for the purpose of describing specific embodiments only and is not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like can be adopted to describe various information in the present disclosure, the information should not be limited to these terms. These terms are only adopted to distinguish the information of the same type. For example, without departing from the scope of the present disclosure, first information can also be called second information; similarly, second information can also be called first information. For example, term "if" used here can be explained as "while" or "when" or "responsive to determining/in response to determining," which depends on the context.

Figure 1:
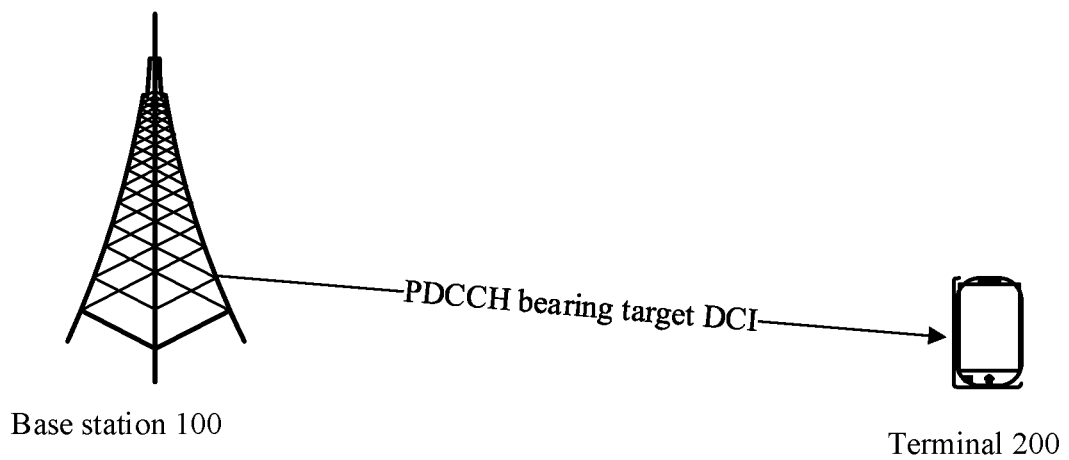
FIG. 1 is a schematic diagram illustrating a DCI configuration scenario, according to an exemplary embodiment.

An embodiment of the present disclosure provides a DCI configuration scenario. As illustrated in FIG. 1, when a base station 100 is required to transmit common DCI or a terminal 200 is required to perform data transmission, a PDCCH bearing target DCI can be sent to the terminal 200. The target DCI includes control information required by at least one target time-domain transmission unit on at least one target bandwidth part, the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

The terminal 200, after demodulating the target DCI from the PDCCH, executes a corresponding control operation on the target time-domain transmission unit on/of the target bandwidth part indicated by the target DCI.

A method for configuring DCI provided in embodiments of the present disclosure will be introduced at first from a base station side.

Figure 2:
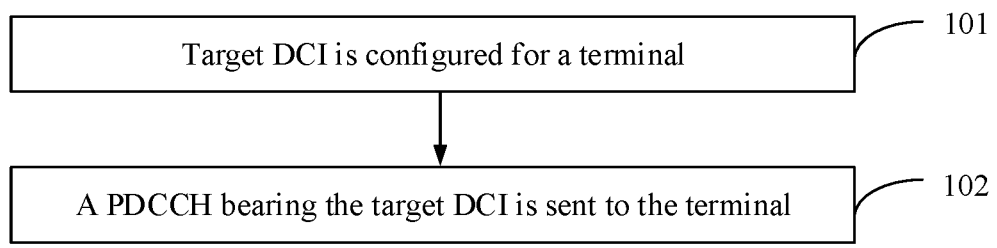
FIG. 2 is a flow chart showing a method for configuring DCI, according to an exemplary embodiment.

An embodiment of the present disclosure provides a method for configuring DCI. Referring to FIG. 2, FIG. 2 is a flow chart showing a method for configuring DCI, according to an exemplary embodiment. The method can be applied to the base station 100 in the scenario illustrated in FIG. 1, and includes the following steps.

At S101, target DCI is configured for a terminal, and the target DCI includes control information required by at least one target time-domain transmission unit on at least one target bandwidth part.

At S102, a PDCCH bearing the target DCI is sent to the terminal, and the target DCI is configured for the terminal to execute a corresponding control operation on the target time-domain transmission unit of/on the indicated target bandwidth part. The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

In the above embodiment, the base station can configure the target DCI for the terminal, and the DCI includes the control information required by the at least one target time-domain transmission unit on the at least one target bandwidth part. Furthermore, the base station sends the PDCCH bearing the target DCI to the terminal. The terminal, after demodulating the target DCI from the PDCCH, executes the corresponding control operation on the target time-domain transmission unit of the target bandwidth part indicated by the target DCI. Through the process, the base station can configure the control information required by the at least one target time-domain transmission unit on the at least one target bandwidth part for the terminal, thus improving performance of a 5G system.

Figure 3:
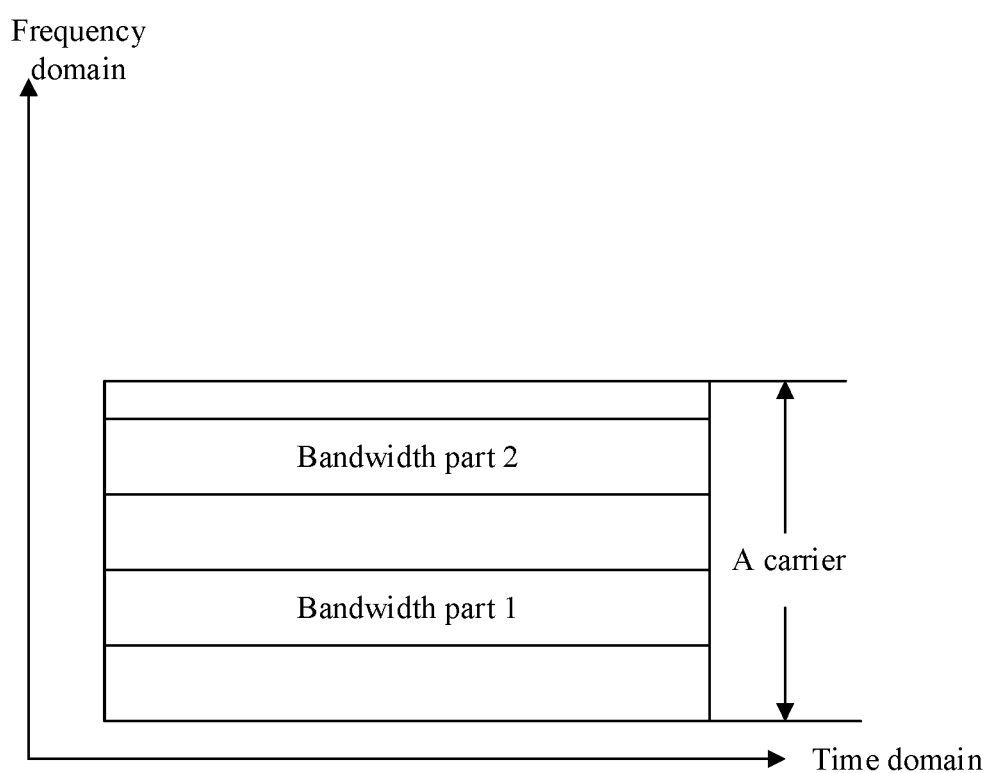
FIG. 3 is a flow chart showing another method for configuring DCI, according to an exemplary embodiment.

For the above Step 101, the bandwidth part is introduced at first. As illustrated in FIG. 3, the bandwidth part is the pre-specified frequency-domain resource on each carrier between the base station and the terminal, and each terminal can support at least one bandwidth part.

In the embodiment of the present disclosure, the target DCI configured for the terminal by the base station includes the control information required by the at least one target time-domain transmission unit on the at least one target bandwidth part. The target bandwidth part is the bandwidth part indicated by the target DCI, and the target time-domain transmission unit is the time-domain transmission unit on the target bandwidth part indicated by the target DCI. The time-domain transmission unit can be a slot.

Figure 4:
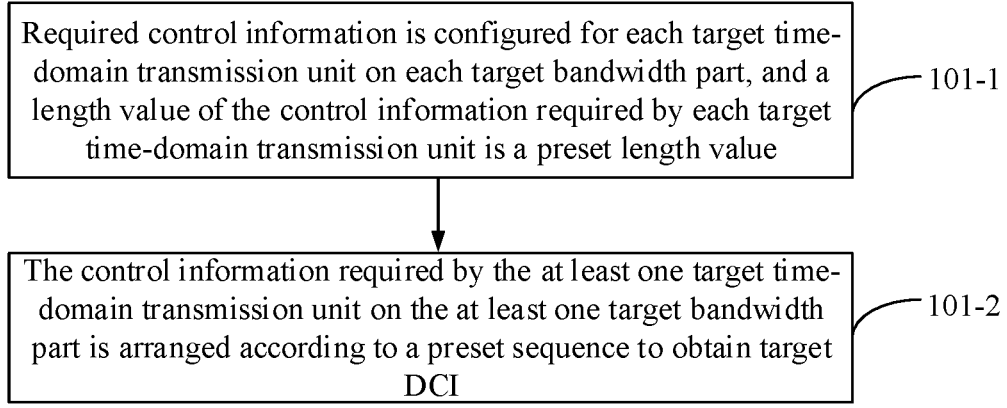
FIG. 4 is a flow chart showing another method for configuring DCI, according to an exemplary embodiment.

Referring to FIG. 4, FIG. 4 is a flow chart showing another method for configuring DCI, according to the embodiment illustrated in FIG. 2. Step 101 can include the following steps.

At S101-1, the required control information is configured for each target time-domain transmission unit on each target bandwidth part, and a length value of the control information required by each target time-domain transmission unit is a preset length value.

In the step, the base station can configure the required control information for each target time-domain transmission unit on each target bandwidth part according to the related art. Optionally, the length value of the control information required by each target time-domain transmission unit can be a preset length value, for example, 5 bits. In the embodiment of the present disclosure, the control information required by each target time-domain transmission unit can be configured to indicate any one of a data transmission direction, a resource allocation manner, or a modulation and coding scheme.

Figure 5A:
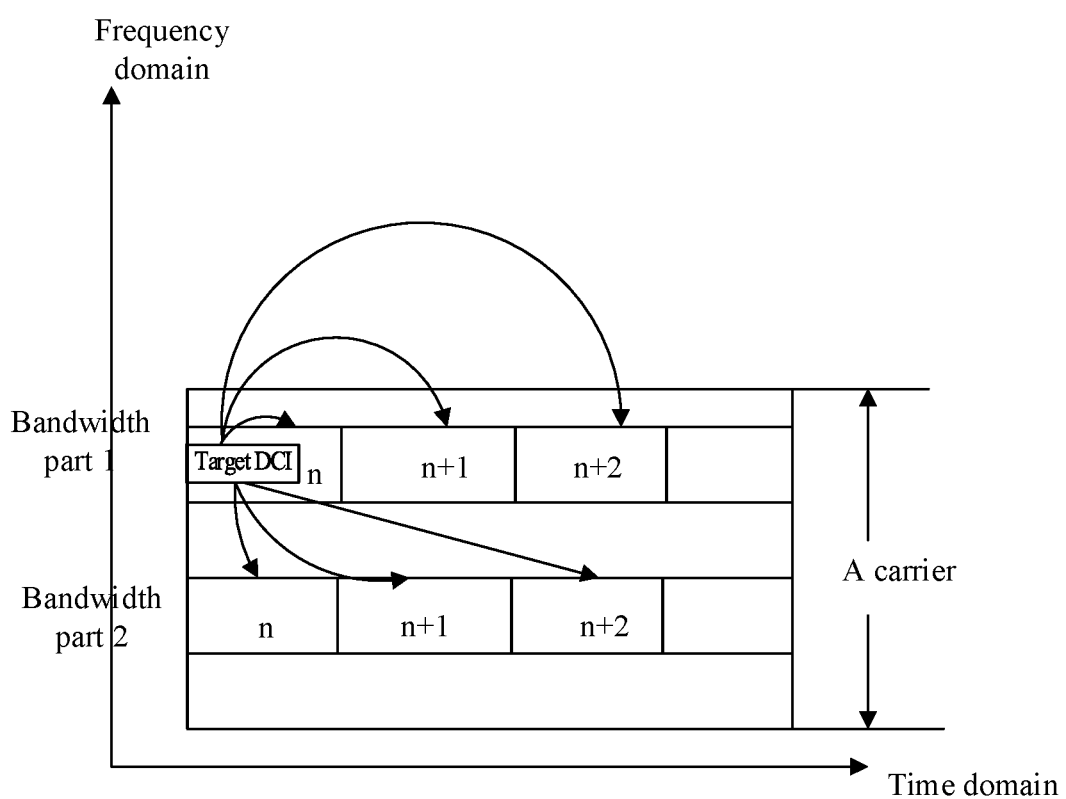
FIG. 5A is a first schematic diagram illustrating a DCI configuration scenario, according to an exemplary embodiment.

Taking the control information for indicating the data transmission direction as an example, as illustrated in FIG. 5A, the base station can configure required control information for indicating a data transmission direction for three time-domain transmission units n, n+1 and n+2 on two target bandwidth parts including a bandwidth part 1 and a bandwidth part 2, respectively.

At S101-2, the control information required by the at least one target time-domain transmission unit on the at least one target bandwidth part is arranged according to a preset sequence to obtain the target DCI.

In the step, the base station can arrange the control information required by each target time-domain transmission unit on each target bandwidth part according to the preset sequence to obtain the target DCI. The preset sequence can be a sequence from small to large numbers of bandwidth parts and from small to large numbers of target time-domain transmission units, as illustrated in FIG. 5B.

Through the process, a purpose that the base station configures the control information required by the at least one target time-domain transmission unit on the at least one target bandwidth part for the terminal is achieved, and the performance of the 5G system is improved.

For the above Step 102, the base station can bear the target DCI through the PDCCH according to the related art and further send the PDCCH to the terminal according to the related art, and the terminal can demodulate the target DCI from the PDCCH according to the related art and further execute the corresponding control operation on the target time-domain transmission unit of the target bandwidth part indicated by the target DCI.

The control operation can include any one of a data transmission operation, a resource allocation operation, or a modulation and coding operation.

In the embodiment of the present disclosure, the length value of the configured target DCI can be a fixed value, for example, a preset total length value; or the length value of the target DCI can also be variable and is a configurable total length value, and the configurable total length value can be based on a length value sum of the control information required by the target time-domain transmission unit on the target bandwidth part.

When the length value of the target DCI is the preset total length value, for avoiding the length value sum of the control information required by the at least one target time-domain transmission unit on the at least one target bandwidth part exceeding the preset total length value, the base station, when configuring the target DCI, can set that a total number of the target bandwidth parts does not exceed a preset bandwidth part number and a total number of the target time-domain transmission units also does not exceed a preset time-domain transmission unit number.

That is, it can be limited that, when the base station configures the target DCI of which the length value is the preset total length value, the total number of the target bandwidth parts does not exceed the preset bandwidth part number and the total number of the target time-domain transmission units also does not exceed the preset time-domain transmission unit number.

For example, the preset bandwidth part number can be 2, and the preset time-domain transmission unit number is 3. In such case, the base station configures DCI corresponding to at most two target bandwidth parts and at most three target time-domain transmission units on each target bandwidth part in a piece of target DCI.

In an embodiment, it is possible that the length value sum of the control information required by the at least one target time-domain transmission unit on the at least one target bandwidth part is less than the preset total length value. For example, the terminal supports a bandwidth part, and a piece of DCI is only required to transmit transmission directions on three time-domain transmission units. In such case, the target DCI includes totally 15 bits configured to transmit data transmission directions corresponding to different time-domain transmission units, the preset total length value is 30, and there is left an idle field of 15 bits.

Figure 6:
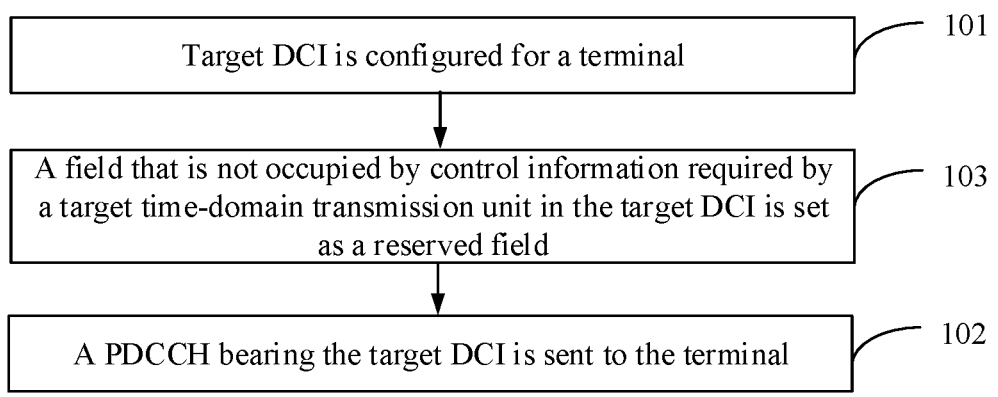

Referring to FIG. 6, FIG. 6 is a flow chart showing another method for configuring DCI, according to the embodiment illustrated in FIG. 2. The method can further include the following step.

At S103, a field that is not occupied by the control information required by the target time-domain transmission unit in the target DCI is set as a reserved field.

In the step, the base station can set the field that is not occupied by the control information required by the target time-domain transmission unit in the target DCI as the reserved field, and the reserved field is a field containing no information. When the reserved field is not set, a field that is not occupied by the control information required by the target time-domain transmission unit can be configured to transmit other information, the target DCI demodulated by a terminal side according to the preset total length value includes the other information, such that the demodulated target DCI is inaccurate.

Figure 7:
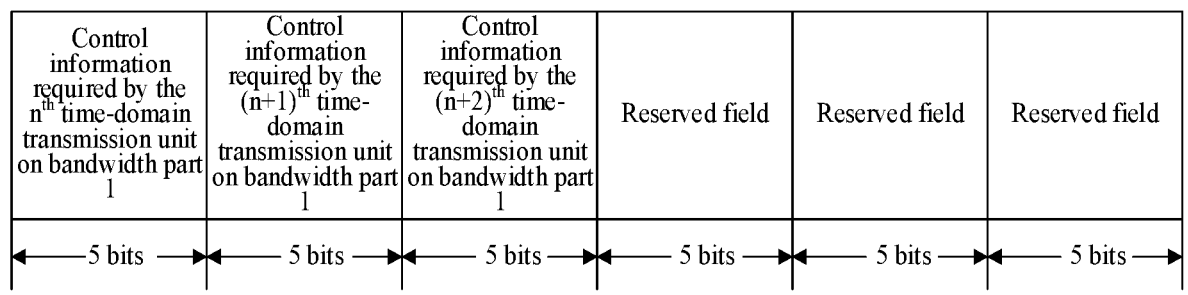
FIG. 7 is a schematic diagram illustrating another DCI configuration scenario, according to an exemplary embodiment.

For example, the field of 15 bits that is not occupied by the DCI is set as the reserved field, as illustrated in FIG. 7. The reserved field contains no information.

Through the process, when the length value of the target DCI is the preset total length value and the length value sum of the control information required by the at least one target time-domain transmission unit on the at least one target bandwidth part is less than the preset total length value, the reserved field can be set in the target DCI, and the reserved field is a field that is not occupied by the control information required by the target time-domain transmission unit and contains no information. Through the process, after the terminal demodulates the target DCI according to the preset total length value, accuracy of the obtained control information required by each target time-domain transmission unit on each target bandwidth part can be ensured.

Figure 8:
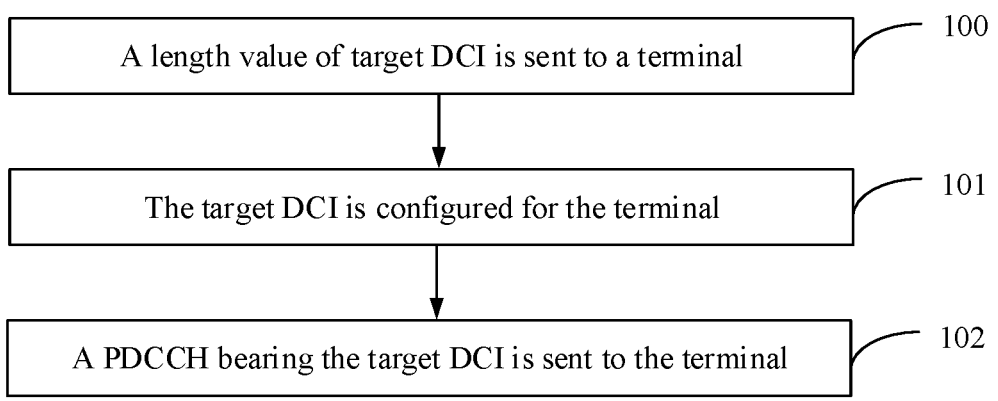
FIG. 8 is a flow chart showing another method for configuring DCI, according to an exemplary embodiment.

In an embodiment, referring to FIG. 8, FIG. 8 is a flow chart showing another method for configuring DCI, according to the embodiment illustrated in FIG. 2. Before Step 101, the method can further include the following step.

At S100, a length value of the target DCI is sent to the terminal, and the length value of the target DCI is configured for the terminal to demodulate the target DCI from the PDCCH.

When the length value of the target DCI is the preset total length value, the base station can send the preset total length value to the terminal through target signaling. The target signaling can be any one of radio resource control signaling, system information, media access control address control unit or physical-layer signaling.

The base station can send the preset total length value to the terminal through independent target signaling, and can also multiplex certain target signaling for the preset total length value and information in the target signaling to send the preset total length value to the terminal through the target signaling.

Or, the base station can also send the preset total length value to the terminal in a predefinition manner. For example, the preset total length value is pre-specified in a communication protocol, the base station sends triggering signaling to the terminal, and the terminal automatically acquires the preset total length value according to the triggering signaling. The triggering signaling can be any one of radio resource control signaling, system information, media access control address control unit or physical-layer signaling.

When the length value of the target DCI is the configurable total length value, the base station can send information indicating the configurable total length value to the terminal through the target signaling. Of course, the target signaling can be any one of the radio resource control signaling, the system information, the media access control address control unit or physical-layer signaling. The base station can send a real-time total length value to the terminal through independent target signaling, and can also multiplex certain target signaling for the real-time total length value and information in the target signaling to send the real-time total length value to the terminal through the target signaling.

For example, the number of the target bandwidth part configured for the terminal by the base station is 1, the number of the target time-domain transmission unit on the target bandwidth part is 3, and the control information required by each target time-domain transmission unit occupies 5 bits. The base station sends such information to the terminal as the information indicating the configurable total length value through the target signaling, and the terminal can determine that the length value of the target DCI is 15 bits.

In the embodiment, the base station, before configuring the target DCI for the terminal, can further send the length value of the target DCI to the terminal to ensure that the terminal can subsequently demodulate the target DCI successfully from the PDCCH bearing the target DCI according to the length value of the target DCI. Optionally, when the length value of the target DCI is the preset total length value, the preset total length value is sent to the terminal through the target signaling or in the predefinition manner. When the length value of the target DCI is the configurable total length value, the information indicating the configurable total length value can be sent to the terminal through the target signaling. Through the process, accuracy of the target DCI demodulated by the terminal can be ensured.

The method for configuring DCI provided in embodiments of the present disclosure at a terminal side will be introduced.

Figure 9:
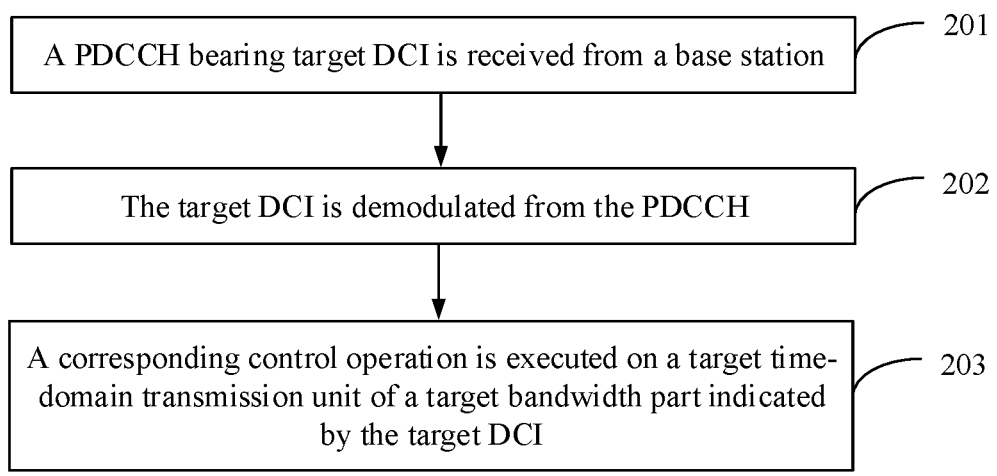
FIG. 9 is a flow chart showing another method for configuring DCI, according to an exemplary embodiment.

Referring to FIG. 9, FIG. 9 is a flow chart showing a method for configuring DCI, according to an exemplary embodiment. The method can be applied to the terminal 200 in the scenario illustrated in FIG. 1, and includes the following steps.

At S201, a PDCCH bearing target DCI is received from a base station, and the target DCI includes control information required by a target time-domain transmission unit on at least one target bandwidth part.

At S202, the target DCI is demodulated from the PDCCH.

At S203, a corresponding control operation is executed on the target time-domain transmission unit of/on the target bandwidth part indicated by the target DCI.

The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

In the embodiment, the terminal can receive the PDCCH bearing the target DCI from the base station, and the target DCI includes the control information required by the target time-domain transmission unit on the at least one target bandwidth part. The terminal further demodulates the target DCI from the PDCCH, thereby executing the corresponding control operation on the target time-domain transmission unit of the target bandwidth part indicated by the target DCI. Through the process, the terminal can execute the corresponding control operation on the target time-domain transmission unit of the target bandwidth part indicated by the target DCI according to the control information configured by the base station and required by the at least one target time-domain transmission unit on the at least one target bandwidth part, thus improving performance of a 5G system.

For the above Step 201, the base station, after completing configuring the target DCI, can bear the target DCI through the PDCCH and further send the PDCCH to the terminal, such that the terminal directly receives.

The target DCI includes the control information required by the target time-domain transmission unit on the at least one target bandwidth part, the target bandwidth part is the bandwidth part indicated by the target DCI, the bandwidth part is the pre-specified frequency-domain resource on each carrier between the base station and the terminal, and the target time-domain transmission unit is the time-domain transmission unit on the target bandwidth part indicated by the target DCI.

Figure 10:
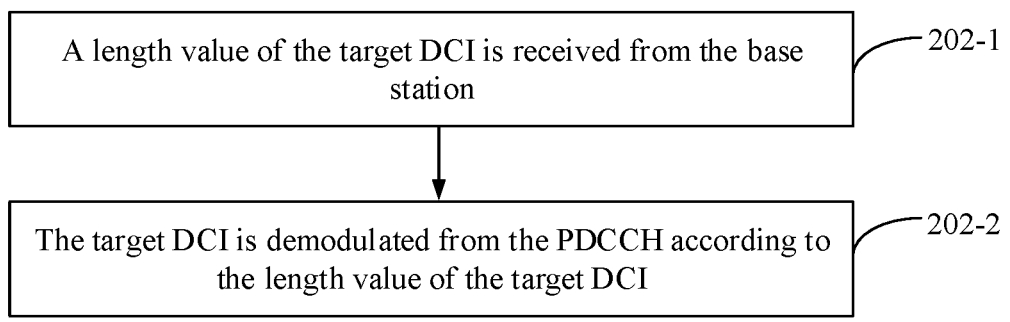
FIG. 10 is a flow chart showing another method for configuring DCI, according to an exemplary embodiment.

For the above Step 202, referring to FIG. 10, FIG. 10 is a flow chart showing another method for configuring DCI, according to the embodiment illustrated in FIG. 9. Step 202 can include the following steps.

At S202-1, a length value of the target DCI is received from the base station.

In the step, when the length value of the target DCI is a preset total length value, the base station can send the length value of the target DCI to the terminal through target signaling or in a predefinition manner. When the length value of the target DCI is a configurable total length value, the base station can send information indicating the configurable total length value to the terminal through the target signaling. After directly receiving it, the terminal can determine the length value of the target DCI according to the information indicating the configurable total length value.

The target signaling can be any one of radio resource control signaling, system information, media access control address control unit or physical-layer signaling.

At S202-2, the target DCI is demodulated from the PDCCH according to the length value of the target DCI.

In the step, after determining the length value of the target DCI, the terminal can demodulate the target DCI from the PDCCH according to the related art.

Figure 11:
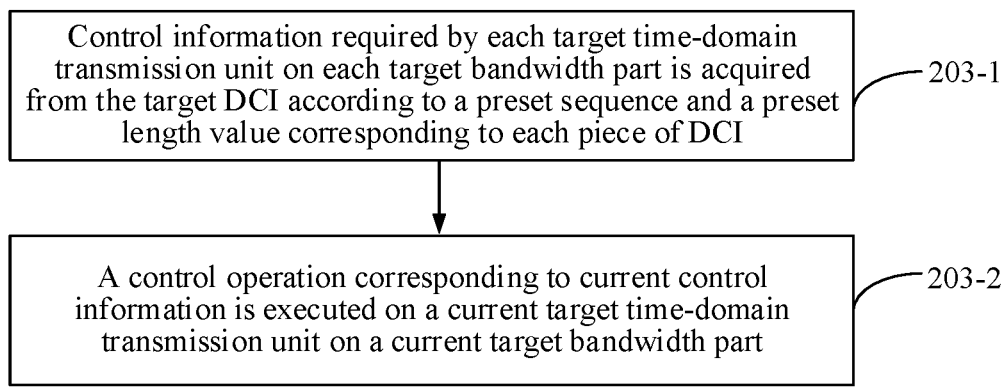
FIG. 11 is a flow chart showing another method for configuring DCI, according to an exemplary embodiment.

For the above Step 203, referring to FIG. 11, FIG. 11 is a flow chart showing another method for configuring DCI, according to the embodiment illustrated in FIG. 9. Step 203 can include the following steps.

At S203-1, the control information required by each target time-domain transmission unit on each target bandwidth part is acquired from the target DCI according to a preset sequence and a preset length value corresponding to each piece of DCI.

In the step, when the preset sequence is a sequence from small to large numbers of target bandwidth parts and from small to large numbers of target time-domain transmission units and the preset length value is 5 bits, the terminal can determine first 5 bits in the target DCI as control information required by a target time-domain transmission unit 1 on a target bandwidth part 1, and so on. In such a manner, the control information required by each target time-domain transmission unit on each target bandwidth part can be acquired from the target DCI.

At S203-2, a control operation corresponding to current control information is executed on a current target time-domain transmission unit on a current target bandwidth part.

In the step, when the current control information indicates a data transmission direction, the terminal executes a data transmission operation on the current target time-domain transmission unit on the current target bandwidth part. When the current control information indicates a downlink transmission manner, a downlink data transmission operation is executed. When the current control information indicates an uplink transmission manner, an uplink data transmission operation is executed.

When the current control information indicates a resource allocation manner, the terminal executes a resource allocation operation on the current target time-domain transmission unit on the current target bandwidth part. Similarly, uplink or downlink resource allocation can be performed according to the current control information.

When the current control information indicates a modulation and coding scheme, the terminal executes a modulation and coding operation on transmitted data on the current target time-domain transmission unit on the current target bandwidth part according to the modulation and coding scheme.

In the above embodiment, the terminal can execute the corresponding control operation on the target time-domain transmission unit of the target bandwidth part indicated by the target DCI according to the control information configured by the base station and required by the at least one target time-domain transmission unit on the at least one target bandwidth part, so that the performance of the 5G system is improved.

Figure 12:
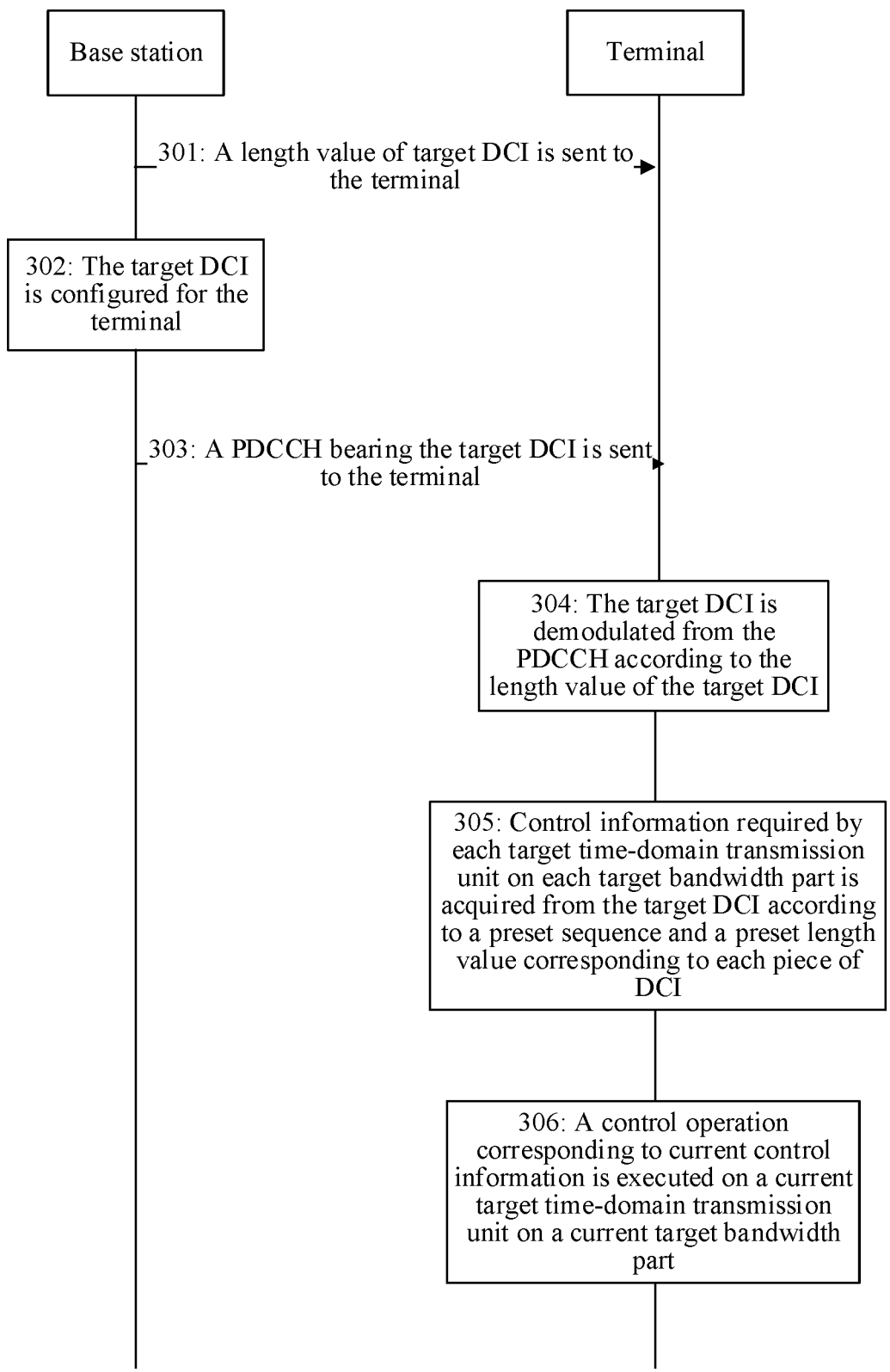
FIG. 12 is a flow chart showing another method for configuring DCI, according to an exemplary embodiment.

Referring to FIG. 12, FIG. 12 is a flow chart showing a method for configuring DCI, according to an exemplary embodiment. The method includes the following steps.

At S301, a base station sends a length value of target DCI to a terminal, and the target DCI includes control information required by at least one target time-domain transmission unit on at least one target bandwidth part.

The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

When the length value of the target DCI is a preset total length value, the base station can send the preset total length value to the terminal through target signaling or in a pre-definition manner. When the length value of the target DCI is a configurable total length value, the base station can send information indicating the configurable total length value to the terminal through the target signaling. At S302, the base station configures the target DCI for the terminal.

A configuration/configuring method is as mentioned in the abovementioned embodiment and will not be elaborated herein.

Optionally, when the length value of the target DCI is the preset total length value and a length value sum of the DCI corresponding to the at least one target time-domain transmission unit on the at least one target bandwidth part is less than the preset total length value, a field that is not occupied by the control information in the target DCI is set as a reserved field, and the reserved field is a field containing no information.

At S303, the base station sends a PDCCH bearing the target DCI to the terminal.

At S304, the terminal demodulates the target DCI from the PDCCH according to the length value of the target DCI.

At S305, the terminal acquires the control information required by each target time-domain transmission unit on each target bandwidth part from the target DCI according to a preset sequence and a preset length value corresponding to each piece of DCI.

At S306, the terminal executes a control operation corresponding to current control information on a current target time-domain transmission unit on/of a current target bandwidth part.

In the embodiment, the base station configures the control information required by the at least one target time-domain transmission unit on the at least one target bandwidth part for the terminal, and the terminal can execute the control operation corresponding to the current control information on the current target time-domain transmission unit on the current target bandwidth part according to the target DCI configured by the base station, thus improving performance of a 5G system.

For simple description, each of the abovementioned method embodiments is expressed as a combination of a series of operations, but those skilled in the art should know that the present disclosure is not limited to the described operation sequence because some steps can be executed in other sequences or at the same time according to the present disclosure.

Secondly, those skilled in the art should also know that all the embodiments described in the specification are optional embodiments and involved operations and modules are not always required by the present disclosure.

Corresponding to the abovementioned application function realization method embodiments, the present disclosure also provides embodiments of an application function realization device and a corresponding terminal.

Figure 13:
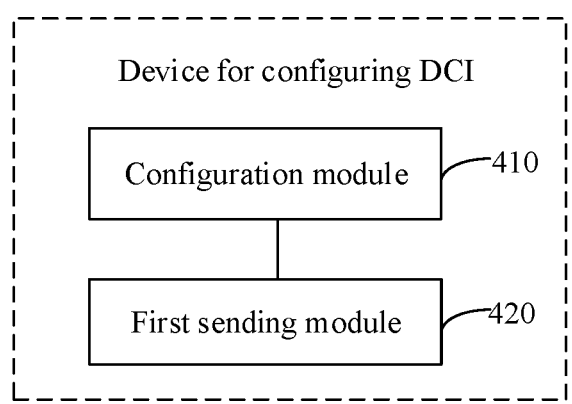
FIG. 13 is a block diagram of a device for configuring DCI, according to an exemplary embodiment.

FIG. 13 is a block diagram of a device for configuring DCI, according to an exemplary embodiment. The device is applied to a base station. The device includes: a configuration module 410 and a first sending module 420.

The configuration module 410 is configured to configure target DCI for a terminal; and the target DCI includes control information required by at least one target time-domain transmission unit on at least one target bandwidth part.

The first sending module 420 is configured to send a PDCCH bearing the target DCI to the terminal; and the target DCI is configured for the terminal to execute a corresponding control operation on the target time-domain transmission unit of/on an indicated target bandwidth part.

The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

Figure 14:
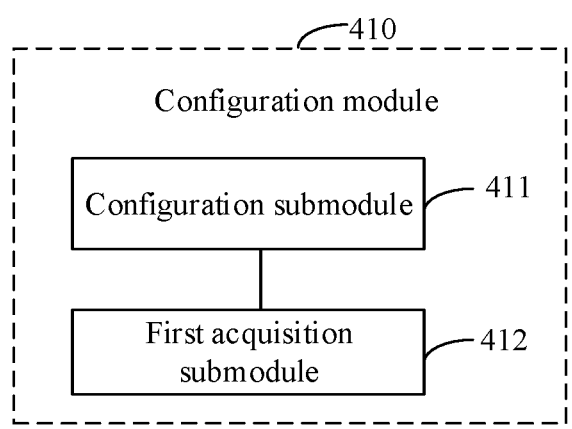
FIG. 14 is a block diagram of another device for configuring DCI, according to an exemplary embodiment.

Referring to FIG. 14, FIG. 14 is a block diagram of another device for configuring DCI based on the embodiment illustrated in FIG. 13. The configuration module 410 includes: a configuration submodule 411 and a first acquisition submodule 412.

The configuration submodule 411 is configured to configure the required control information for each target time-domain transmission unit on each target bandwidth part; and a length value of the control information required by each target time-domain transmission unit is a preset length value.

The first acquisition submodule 412 is configured to arrange the control information required by the at least one target time-domain transmission unit on the at least one target bandwidth part according to a preset sequence to obtain the target DCI.

Figure 15:
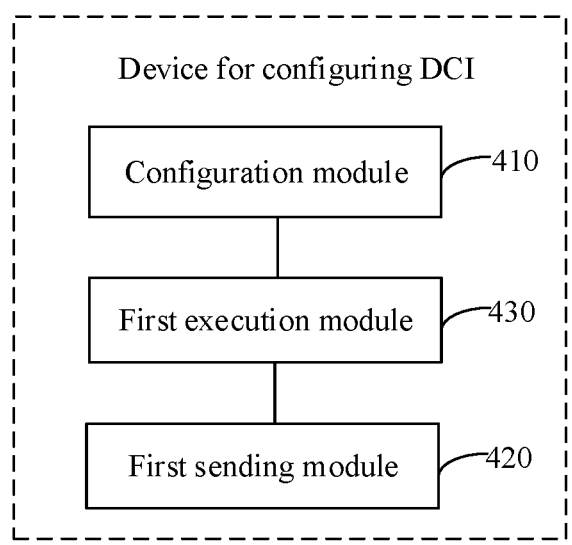
FIG. 15 is a block diagram of another device for configuring DCI, according to an exemplary embodiment.

Optionally, a length value of the target DCI is a preset total length value or a configurable total length value, and the configurable total length value is based on a length value sum of the control information required by the target time-domain transmission unit on the target bandwidth part. Referring to FIG. 15, FIG. 15 is a block diagram of another device for configuring DCI based on the embodiment illustrated in FIG. 13. The device further includes: a first execution module 430.

The first execution module 430 is configured to, when the length value of the target DCI is the preset total length value and the length value sum of the control information required by the at least one target time-domain transmission unit on the at least one target bandwidth part is less than the preset total length value, set a field that is not occupied by the control information required by the target time-domain transmission unit in the target DCI as a reserved field; and the reserved field is a field containing no information.

Figure 16:
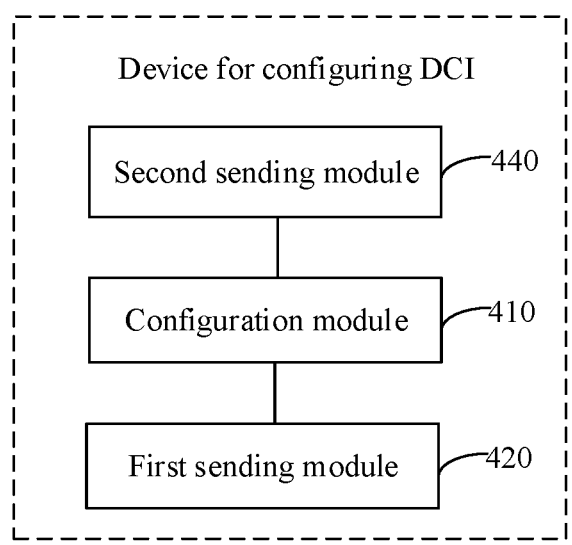
FIG. 16 is a block diagram of another device for configuring DCI, according to an exemplary embodiment.

Referring to FIG. 16, FIG. 16 is a block diagram of another device for configuring DCI based on the embodiment illustrated in FIG. 13. The device further includes: a second sending module 440.

The second sending module 440 is configured to send the length value of the target DCI to the terminal; and the length value of the target DCI is configured for the terminal to demodulate the target DCI from the PDCCH.

Figure 17:
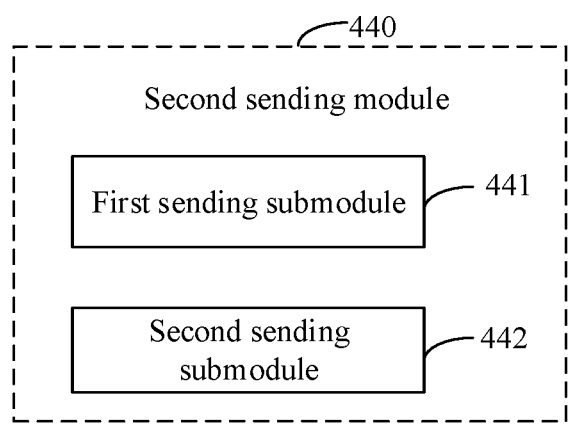
FIG. 17 is a block diagram of another device for configuring DCI, according to an exemplary embodiment.

Referring to FIG. 17, FIG. 17 is a block diagram of another device for configuring DCI based on the embodiment illustrated in FIG. 16. The second sending module 440 includes: a first sending submodule 441 and a second sending submodule 442.

The first sending submodule 441 is configured to, when the length value of the target DCI is the preset total length value, send the preset total length value to the terminal through target signaling or in a predefinition manner; and The second sending submodule 442 is configured to, when the length value of the target DCI is the configurable total length value, send information indicating the configurable total length value to the terminal through the target signaling.

The target signaling including any one of:
radio resource control signaling, system information, media access control address control unit or physical-layer signaling.

Figure 18:
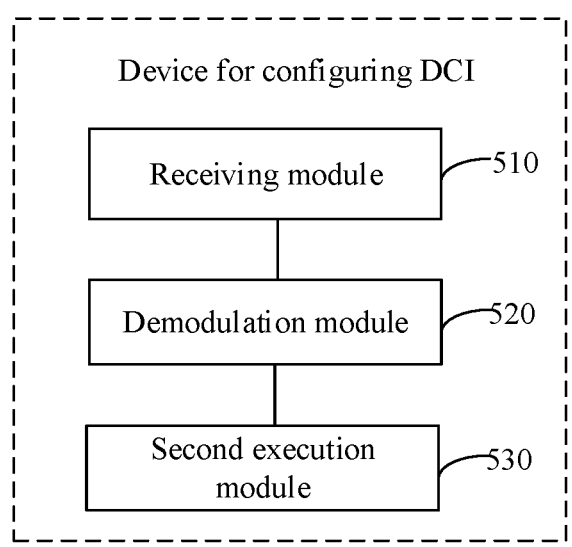
FIG. 18 is a block diagram of another device for configuring DCI, according to an exemplary embodiment.

FIG. 18 is a block diagram of a device for configuring DCI, according to an exemplary embodiment. The device is applied to a terminal. The device includes: a receiving module 510, a demodulation module 520 and a second execution module 530.

The receiving module 510 is configured to receive a PDCCH bearing target DCI from a base station, and the target DCI includes control information required by a target time-domain transmission unit on at least one target bandwidth part;

The demodulation module 520 is configured to demodulate the target DCI from the PDCCH; and The second execution module 530 is configured to execute a corresponding control operation on the target time-domain transmission unit of/on the target bandwidth part indicated by the target DCI.

The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

Figure 19:
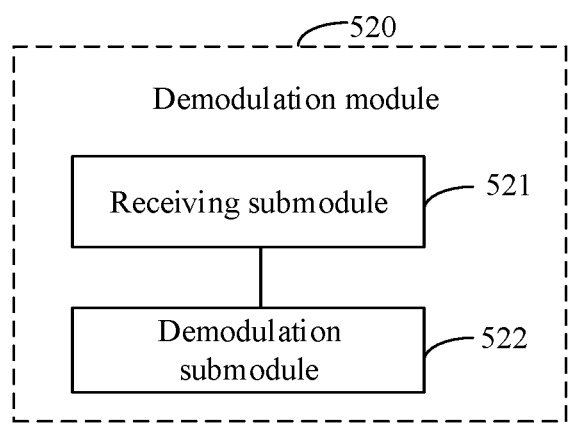
FIG. 19 is a block diagram of another device for configuring DCI, according to an exemplary embodiment.

Referring to FIG. 19, FIG. 19 is a block diagram of another device for configuring DCI based on the embodiment illustrated in FIG. 18. The demodulation module 520 includes: a receiving submodule 521 and a demodulation submodule 522.

The receiving submodule 521 is configured to receive a length value of the target DCI from the base station; and The demodulation submodule 522 is configured to demodulate the target DCI from the PDCCH according to the length value of the target DCI.

Figure 20:
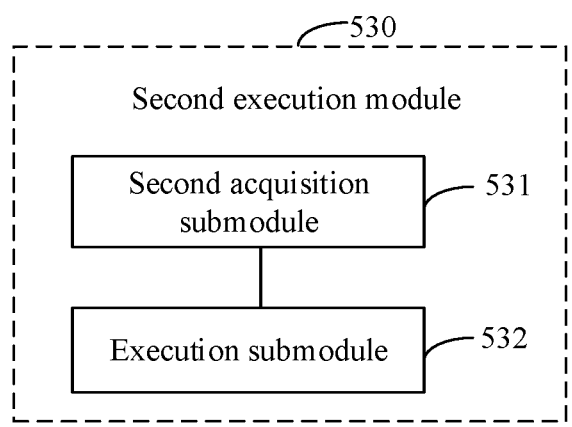
FIG. 20 is a block diagram of another device for configuring DCI, according to an exemplary embodiment.

Referring to FIG. 20, FIG. 20 is a block diagram of another device for configuring DCI based on the embodiment illustrated in FIG. 18. The second execution module 530 includes: a second acquisition submodule 531 and an execution submodule 532.

The second acquisition submodule 531 is configured to acquire the control information required by each target time-domain transmission unit on each target bandwidth part from the target DCI according to a preset sequence and a preset length value corresponding to each piece of DCI; and The execution submodule 532 is configured to execute a control operation corresponding to current control information on a current target time-domain transmission unit on a current target bandwidth part.

The device embodiments substantially correspond to the method embodiments, and thus related parts refer to part of descriptions of the method embodiments. The device embodiments described above are only schematic, units described as separate parts therein can or cannot be physically separated, and parts displayed as units can or cannot be physical units, and namely can be located in the same place or can also be distributed to multiple network units. Part or all of the modules therein can be selected according to a practical requirement to achieve the purpose of the solutions of the present disclosure. Those of ordinary skill in the art can understand and implement without creative work.

Correspondingly, the present disclosure also provides a computer-readable storage medium which stores a computer program; and the computer program is configured to execute the method for configuring DCI applied to the base station side.

Correspondingly, the present disclosure also provides a computer-readable storage medium which stores a computer program; and the computer program is configured to execute the method for configuring DCI applied to the terminal side.

Correspondingly, the present disclosure also provides a device for configuring DCI, which is applied to a base station and includes:

a processor; and a memory configured to store an instruction executable for the processor.

The processor is configured to:

configure target DCI for a terminal; and the target DCI includes control information required by at least one target time-domain transmission unit on at least one target bandwidth part; and send a PDCCH bearing the target DCI to the terminal; and the target DCI is configured for the terminal to execute a corresponding control operation on the target time-domain transmission unit of/on the indicated target bandwidth part. The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

Figure 21:
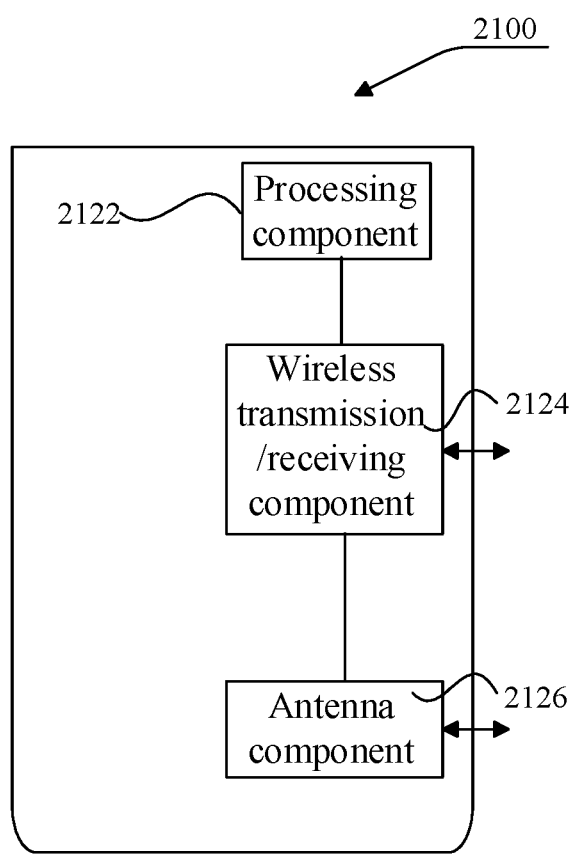
FIG. 21 is a structure diagram of a device for configuring DCI, according to an exemplary embodiment of the present disclosure.

As illustrated in FIG. 21, FIG. 21 is a structure diagram of a device for configuring DCI 2100, according to an exemplary embodiment. The device 2100 can be provided as a base station. Referring to FIG. 21, the device 2100 includes a processing component 2122, a wireless transmission/receiving component 2124, an antenna component 2126 and a wireless interface-specific signal processing part. The processing component 2122 can further include one or more processors.

One processor in the processing component 2122 can be configured to:

configure target DCI for a terminal; and the target DCI includes control information required by at least one target time-domain transmission unit on at least one target bandwidth part; and send a PDCCH bearing the target DCI to the terminal; and the target DCI is configured for the terminal to execute a corresponding control operation on the target time-domain transmission unit of/on the indicated target bandwidth part. The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

Correspondingly, the present disclosure also provides a device for configuring DCI, which is applied to a terminal and includes:

a processor; and a memory configured to store an instruction executable for the processor;

The processor is configured to:

receive a PDCCH bearing target DCI from a base station; and the target DCI includes control information required by a target time-domain transmission unit on at least one target bandwidth part;

demodulate the target DCI from the PDCCH; and execute a corresponding control operation on the target time-domain transmission unit of/on the target bandwidth part indicated by the target DCI.

The target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

Figure 22:
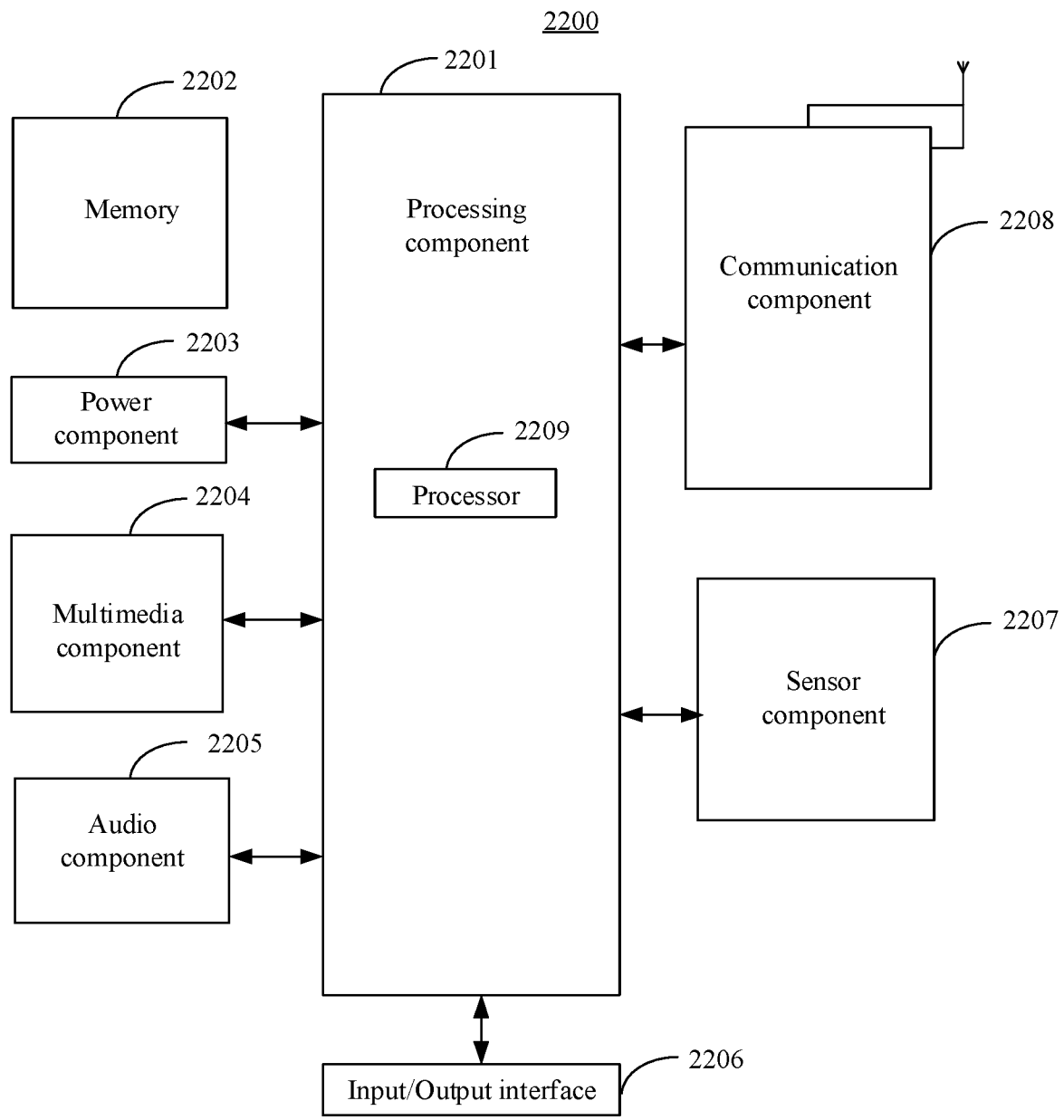
FIG. 22 is a structure diagram of another device for configuring DCI, according to an exemplary embodiment of the present disclosure.

FIG. 22 is a structure diagram of a device for configuring DCI, according to an exemplary embodiment. FIG. 22 illustrates a device for configuring DCI 2200 according to an exemplary embodiment. The device 2200 can be a terminal such as a computer, a mobile phone, a digital broadcast terminal, a messaging device, a gaming console, a tablet, a medical device, exercise equipment and a personal digital assistant.

Referring to FIG. 22, the device 2200 can include one or more of the following components: a processing component 2201, a memory 2202, a power component 2203, a multimedia component 2204, an audio component 2205, an Input/Output (I/O) interface 2206, a sensor component 2207, and a communication component 2208.

The processing component 2201 typically controls overall operations of the device 2200, such as the operations associated with display, telephone calls, data communications, camera operations, and recording operations. The processing component 2201 can include one or more processors 2209 to execute instructions to perform all or part of the steps in the abovementioned method. Moreover, the processing component 2201 can include one or more modules which facilitate interaction between the processing component 2201 and the other components. For instance, the processing component 2201 can include a multimedia module to facilitate interaction between the multimedia component 2204 and the processing component 2201.

The memory 2202 is configured to store various types of data to support the operation of the device 2200. Examples of such data include instructions for any application programs or methods operated on the device 2200, contact data, phonebook data, messages, pictures, video, etc. The memory 2202 can be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 2203 provides power for various components of the device 2200. The power component 2203 can include a power management system, one or more power supplies, and other components associated with generation, management and distribution of power for the device 2200.

The multimedia component 2204 includes a screen providing an output interface between the device 2200 and a user. In some embodiments, the screen can include a Liquid Crystal Display (LCD) and a Touch Panel (TP). When the screen includes the TP, the screen can be implemented as a touch screen to receive an input signal from the user. The TP includes one or more touch sensors to sense touches, swipes and gestures on the TP. The touch sensors not only senses a boundary of a touch or swipe action but also detects a duration and pressure associated with the touch or swipe action. In some embodiments, the multimedia component 2204 includes a front camera and/or a rear camera. The front camera and/or the rear camera can receive external multimedia data when the device 2200 is in an operation mode, such as a photographing mode or a video mode. Each of the front camera and the rear camera can be a fixed optical lens system or have focusing and optical zooming capabilities.

The audio component 2205 is configured to output and/or input an audio signal. For example, the audio component 2205 includes a Microphone (MIC), and the MIC is configured to receive an external audio signal when the device

2200 is in an operation mode, such as a call mode, a recording mode and a voice recognition mode. The received audio signal can further be stored in the memory 2202 or sent through the communication component 2208. In some embodiments, the audio component 2205 further includes a speaker configured to output the audio signal.

The I/O interface 2206 provides an interface between the processing component 2201 and a peripheral interface module, and the peripheral interface module can be a keyboard, a click wheel, a button and the like. The button can include, but not limited to: a home button, a volume button, a starting button and a locking button.

The sensor component 2207 includes one or more sensors configured to provide status assessment in various aspects for the device 2200. For instance, the sensor component 2207 can detect an on/off status of the device 2200 and relative positioning of components, such as a display and small keyboard of the device 2200, and the sensor component 2207 can further detect a change in a position of the device 2200 or a component of the device 2200, presence or absence of contact between the user and the device 2200, orientation or acceleration/deceleration of the device 2200 and a change in temperature of the device 2200. The sensor component 2207 can include a proximity sensor configured to detect presence of an object nearby without any physical contact. The sensor component 2207 can also include a light sensor, such as a Complementary Metal Oxide Semiconductor (CMOS) or Charge Coupled Device (CCD) image sensor, configured for use in an imaging application. In some embodiments, the sensor component 2207 can also include an acceleration sensor, a gyroscope sensor, a magnetic sensor, a pressure sensor or a temperature sensor.

The communication component 2208 is configured to facilitate wired or wireless communication between the device 2200 and another device. The device 2200 can access a communication-standard-based wireless network, such as a Wireless Fidelity (Wi-Fi) network, a 2nd-Generation (2G) or 3rd-Generation (3G) network or a combination thereof. In an exemplary embodiment, the communication component 2208 receives a broadcast signal or broadcast associated information from an external broadcast management system through a broadcast channel. In an exemplary embodiment, the communication component 2208 further includes a Near Field Communication (NFC) module to facilitate short-range communications. For example, the NFC module can be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 2200 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 2202 including an instruction, and the instruction can be executed by the processor 2209 of the device 2200 to implement the abovementioned method. For example, the non-transitory computer-readable storage medium can be a ROM, a Random Access Memory (RAM), a Compact Disc Read-Only Memory (CD-ROM), a magnetic tape, a floppy disc, an optical data storage device and the like.

The instruction in the storage medium is executed by the processor to enable the device 2200 to execute any one of methods for configuring DCI applied to a terminal side.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for configuring Downlink Control Information (DCI), applied to a base station, comprising:
    configuring target DCI for a terminal; wherein the target DCI comprises control information required by at least one target time-domain transmission unit on at least one target bandwidth part; and
    sending a Physical Downlink Control Channel (PDCCH) bearing the target DCI to the terminal; wherein the target DCI is configured for the terminal to execute a corresponding control operation on a target time-domain transmission unit of an indicated target bandwidth part;
    wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

2. The method of claim 1, wherein the configuring the target DCI for the terminal comprises:
    configuring the required control information for each target time-domain transmission unit on each target bandwidth part, wherein a length value of the control information required by each target time-domain transmission unit is a preset length value; and
    arranging the control information required by the at least one target time-domain transmission unit on the at least one target bandwidth part according to a preset sequence to obtain the target DCI.

3. The method of claim 1, wherein a length value of the target DCI is a preset total length value or a configurable total length value, wherein the configurable total length value is based on a length value sum of the control information required by the target time-domain transmission unit on the target bandwidth part.

4. The method of claim 3, further comprising:
    when the length value of the target DCI is the preset total length value and the length value sum of the control information required by the at least one target time-domain transmission unit on the at least one target bandwidth part is less than the preset total length value, setting a field that is not occupied by the control information required by the target time-domain transmission unit in the target DCI as a reserved field, wherein the reserved field is a field containing no information.

5. The method of claim 1, further comprising: before configuring the target DCI for the terminal,
sending a length value of the target DCI to the terminal, wherein the length value of the target DCI is configured for the terminal to demodulate the target DCI from the PDCCH.

6. The method of claim 5, wherein the sending the length value of the target DCI to the terminal comprises:
when the length value of the target DCI is a preset total length value, sending the preset total length value to the terminal through target signaling or in a predefinition manner; and
when the length value of the target DCI is a configurable total length value, sending information indicating the configurable total length value to the terminal through the target signaling,
wherein the target signaling comprising any one of:
radio resource control signaling, system information, media access control address control unit or physical-layer signaling.

7. A method for configuring Downlink Control Information (DCI), applied to a terminal, comprising:
receiving a Physical Downlink Control Channel (PDCCH) bearing target DCI from a base station, wherein the target DCI comprises control information required by a target time-domain transmission unit on at least one target bandwidth part;
demodulating the target DCI from the PDCCH; and
executing a corresponding control operation on the target time-domain transmission unit of the target bandwidth part indicated by the target DCI;
wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

8. The method of claim 7, wherein the demodulating the target DCI from the PDCCH comprises:
receiving a length value of the target DCI from the base station; and
demodulating the target DCI from the PDCCH according to the length value of the target DCI.

9. The method of claim 7, wherein the executing the corresponding control operation on the target time-domain transmission unit of the target bandwidth part indicated by the target DCI comprises:
acquiring the control information required by each target time-domain transmission unit on each target bandwidth part from the target DCI according to a preset sequence and a preset length value corresponding to each piece of DCI; and
executing a control operation corresponding to current control information on a current target time-domain transmission unit on a current target bandwidth part.

10. A non-transitory computer-readable storage medium, storing a computer program, the computer program being configured to execute the method for configuring Downlink Control Information (DCI) of claim 1.

11. A device for configuring Downlink Control Information (DCI), applied to a base station, comprising:
a processor; and
a memory configured to store an instruction executable for the processor; wherein the processor is configured to:
configure target DCI for a terminal, wherein the target DCI comprises control information required by at least one target time-domain transmission unit on at least one target bandwidth part; and
send a Physical Downlink Control Channel (PDCCH) bearing the target DCI to the terminal, wherein the target DCI is configured for the terminal to execute a corresponding control operation on a target time-domain transmission unit of an indicated target bandwidth part;
wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

12. A device for configuring Downlink Control Information (DCI), applied to a terminal, comprising:
a processor; and
a memory configured to store an instruction executable for the processor; wherein the processor is configured to:
receive a Physical Downlink Control Channel (PDCCH) bearing target DCI from a base station, wherein the target DCI comprises control information required by a target time-domain transmission unit on at least one target bandwidth part;
demodulate the target DCI from the PDCCH; and
execute a corresponding control operation on the target time-domain transmission unit of the target bandwidth part indicated by the target DCI;
wherein the target bandwidth part is a bandwidth part indicated by the target DCI, the bandwidth part is a pre-specified frequency-domain resource on each carrier between the base station and the terminal, and the target time-domain transmission unit is a time-domain transmission unit on the target bandwidth part indicated by the target DCI.

13. The device of claim 11, wherein the processor is further configured to:
configure the required control information for each target time-domain transmission unit on each target bandwidth part, wherein a length value of the control information required by each target time-domain transmission unit is a preset length value; and
arrange the control information required by the at least one target time-domain transmission unit on the at least one target bandwidth part according to a preset sequence to obtain the target DCI.

14. The device of claim 11, wherein a length value of the target DCI is a preset total length value or a configurable total length value, wherein the configurable total length value is based on a length value sum of the control information required by the target time-domain transmission unit on the target bandwidth part.

15. The device of claim 14, wherein the processor is further configured to:
when the length value of the target DCI is the preset total length value and the length value sum of the control information required by the at least one target time-domain transmission unit on the at least one target bandwidth part is less than the preset total length value, set a field that is not occupied by the control information required by the target time-domain transmission unit in the target DCI as a reserved field, wherein the reserved field is a field containing no information.

16. The device of claim 11, wherein the processor is further configured to:
   send a length value of the target DCI to the terminal, wherein the length value of the target DCI is configured for the terminal to demodulate the target DCI from the PDCCH.

17. The device of claim 16, wherein the processor is further configured to:
   when the length value of the target DCI is a preset total length value, send the preset total length value to the terminal through target signaling or in a predefinition manner; and
   when the length value of the target DCI is a configurable total length value, send information indicating the configurable total length value to the terminal through the target signaling;
   wherein the target signaling comprising any one of:
   radio resource control signaling, system information, media access control address control unit or physical-layer signaling.

18. The device of claim 12, wherein the processor is further configured to:
   receive a length value of the target DCI from the base station; and demodulate the target DCI from the PDCCH according to the length value of the target DCI.

19. The device of claim 12, wherein the processor is further configured to:
   acquire the control information required by each target time-domain transmission unit on each target bandwidth part from the target DCI according to a preset sequence and a preset length value corresponding to each piece of DCI; and
   execute a control operation corresponding to current control information on a current target time-domain transmission unit on a current target bandwidth part.

20. A $5^{th}$-Generation (5G) communication system implementing the method of claim 1, comprising the base station, wherein the base station is adapted to:
   configure the control information required by the at least one target time-domain transmission unit on the at least one target bandwidth part for the terminal;
   configure the required control information for each target time-domain transmission unit on each target bandwidth part, wherein the length value of the control information required by each target time-domain transmission unit is the preset length value;
   arrange the control information required by the at least one target time-domain transmission unit on the at least one target bandwidth part according to the preset sequence to obtain the target DCI; and
   configure the control information required by the at least one target time-domain transmission unit on the at least one target bandwidth part for the terminal, thereby improving performance of the 5G system.

* * * * *